United States Patent

[11] 3,624,338

| [72] | Inventors | Richard E. Ellis<br>Lakewood;<br>Horace O. Winters, Boulder, both of Colo. |
|---|---|---|
| [21] | Appl. No. | 61,556 |
| [22] | Filed | Aug. 6, 1970 |
| [45] | Patented | Nov. 30, 1971 |
| [73] | Assignee | International Business Machines Corporation<br>Armonk, N.Y. |

[54] ELECTRICAL DISCHARGE MACHINING PULSE-POLARITY-REVERSING CONTROL
9 Claims, 1 Drawing Fig.

[52] U.S. Cl.................................................. 219/69 C,
307/127, 307/214, 307/236, 321/57, 323/120
[51] Int. Cl............................................................. B23p 1/08
[50] Field of Search........................................ 200/1 V;
219/69 C, 69 F, 69 G, 69 M, 69 V; 307/127, 214, 236; 321/57; 323/120

[56] References Cited
UNITED STATES PATENTS

| 3,333,080 | 7/1967 | DeVries ...................... | 219/69 M |
| 368,221 | 8/1887 | McDaniel.................... | 200/1 V UX |
| 2,913,598 | 11/1959 | Torrey.......................... | 307/214 |
| 2,951,142 | 8/1960 | Ullmann...................... | 219/69 C |
| 3,204,121 | 8/1965 | Riley ............................ | 307/236 X |

*Primary Examiner*—R. F. Staubly
*Attorneys*—Hanifin and Jancin and Herbert F. Sommermeyer ABSTRACT: A control for an EDM machine selectively reverses polarity of the electrical energy supply to the machining electrode. The control consists of double-pole double-throw switching means connected with a polarity reversing transformer and connected such that the energy source is either connected to the electrode directly or through a polarity reversing transformer. In the normal switch position, the polarity is such that the electrode is eroded slowly. In the reverse switch position, the electrode is eroded rapidly. A diode is provided in the servocontrols to allow normal machine operation.

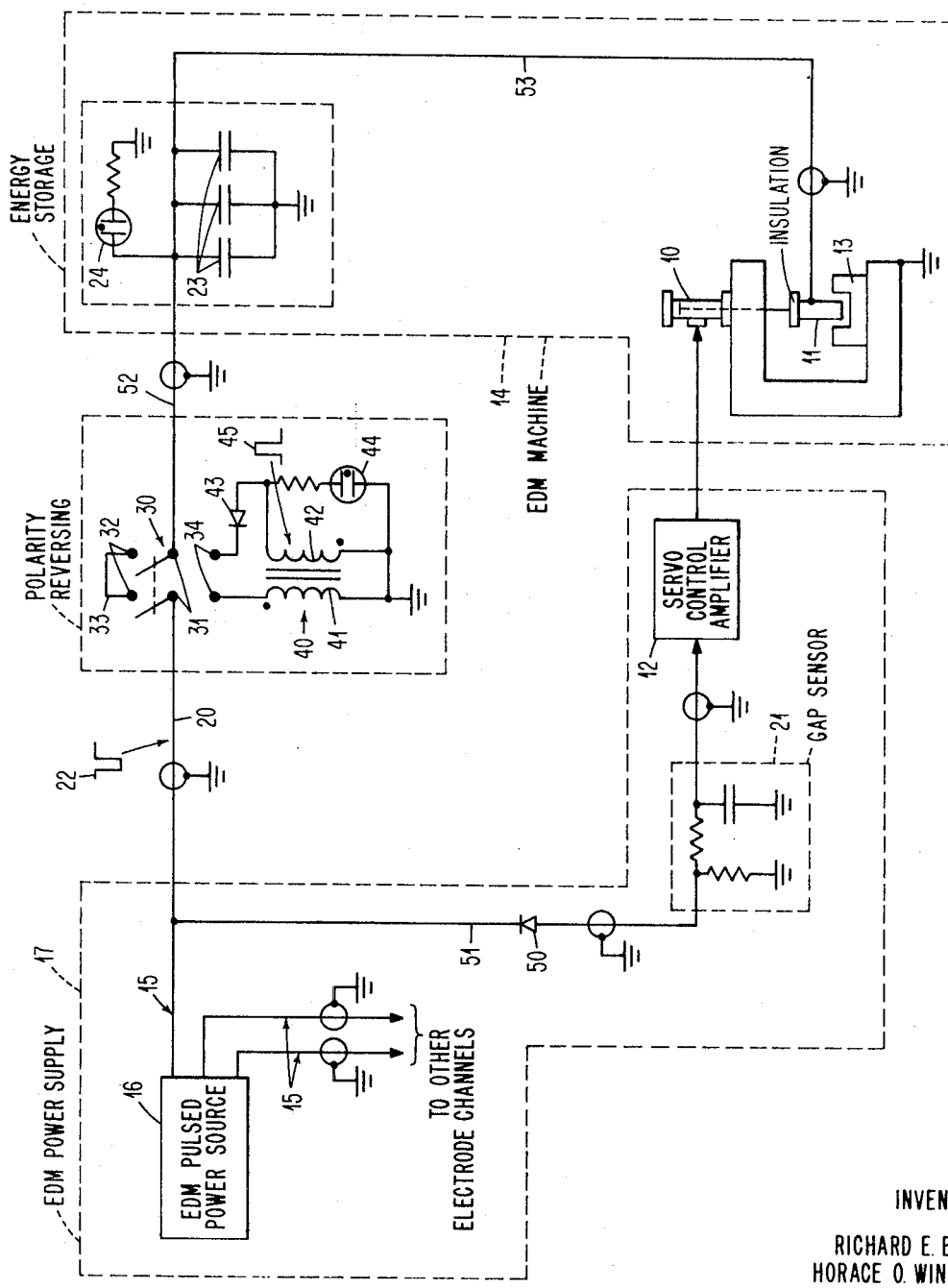

've# 3,624,338

ELECTRICAL DISCHARGE MACHINING PULSE-POLARITY-REVERSING CONTROL

BACKGROUND OF THE INVENTION

The present invention relates to electrical discharge machining devices and particularly to controls facilitating maintenance of the electrode shape.

Electrical discharge machine (EDM) devices are well known. When using such devices, pulsed d-c energy is supplied to the electrode and the resulting electrical discharges erode both the electrode and workpiece. In some precise machining operations such erosion of the electrode must be corrected at relatively frequent intervals. Such correction can be done on the machine by changing machine operation such that a truing jig is substituted for the workpiece to reshape the electrode. During this time, the electrical potential applied to the electrode is reversed such that the flow of electrons erodes the electrode faster than the truing jig.

While the electrical connections to the electrode and truing jig could be physically interchanged, this action is dangerous because high voltage potentials would be placed on the electrical shielding normally used on these machines. Alternately, two power supplies could be used for supplying opposite polarities of signals. Generally, a pulse power supply requires extensive electrical apparatus for supply of each polarity of energy. Since the energy levels are relatively high, an inverting amplifier using either thermionic devices or solid-state devices would add substantially to the cost of the machine.

SUMMARY OF THE INVENTION

It is an object of this invention to provide a simple, inexpensive and facile control means for an EDM machine for truing worn EDM electrodes.

Apparatus using the present invention is characterized by double-pole double-throw switching means electrically interposed between the EDM pulsed energy source and the output circuit. The output circuit may consist of an electrode electrically in parallel with neon indicator lights and energy storage capacitors. The switching means selectively connects the pulsed energy source directly to the output circuit giving negative polarity to the electrode used for the machining operations. A one-to-one pulse transformer is connected to the switching means for selectively reversing the polarity of the pulsed energy. The switching means also selectively connects the transformer means between the pulsed energy source and output circuit such that opposite polarity energy is then applied to the electrode for truing operations. A high speed unidirectional current-conducting means, such as a fast switching diode, is electrically interposed between the pulsed energy source and the gap sensor circuit such that when the pulse transformer means is switched into the output circuit, the servo amplifier is not disabled by the very low impedance of the transformer primary winding.

The foregoing and other objects, features, and advantages of the invention will be apparent from the following more particular description of a preferred embodiment of the invention, as illustrated in the accompanying drawing.

DESCRIPTION OF THE DRAWING

The attached FIGURE shows an illustrative embodiment of the product invention in electrical schematic form.

DETAILED DESCRIPTION

EDM machine tool 14 has insulated electrode 11 vertically movable by hydraulic cylinder 10 under control of a servo amplifier 12. A workpiece or truing jig 13 is disposed on the work table of EDM machine tool 14. The machine tool frame is grounded in the usual manner. IN practice, EDM pulsed power source 16 includes a plurality of EDM electrode channels 15, one channel for each electrode on the machine. For simplicity purposes, only one channel is shown. Common power supply 17 supplies power to all of the channels or alternately there may be separate power supplied to each channel.

Negative voltage pulsed DC power 22 is supplied over wire 20 to the output circuitry. These power pulses are supplied to the electrode/workpiece gap, capacitors 23 and indicator light 24 to perform the necessary machining operations. The term "output circuit" is used to describe capacitors 23, neon indicator 24 and the electrical circuit aspects of tool 11. The machining gap conditions are monitored by gap sensor 21 and the derived signal amplified by servo control amplifier 12. This amplified signal is used to drive hydraulic cylinder 10 so as to maintain preselected average gap voltage. This coordinated relationship of servo system, electrode and workpiece is known and has been accomplished for several years.

The improvement provided by the present invention is to use the same equipment for both machining and truing operations at reversed polarity by merely actuating an electrical switch. Such switch may be manually-actuated double-pole double-throw switch 30, an electrical relay, or an electronic switch. Switch 30 when connecting the pair of common terminals 31 to a first set of connection terminals 32 is in a so-called machining connection. Terminals 32 are shorted together by wire 33. EDM power source 16 provides energy pulses through switch 30 terminals 32 to EDM output circuit 23, 24. Operation of the system is now as previously known. When switch 30 is actuated to connect common terminals 31 to the second set of connection terminals 34, polarity reversal of output voltage 45 is provided.

For truing electrode 11, the electrical energy polarity is reversed. This polarity reversal is accomplished by transformer 40 which is a ferrite core pulse transformer having a one-to-one turns ratio and selected to operate at frequencies, from 20 kHz. to 100 kHz. with a ⅓ duty cycle for current pulses of 20 amperes or so. Primary winding 41 is poled oppositely to that of secondary winding 42. Negative going pulses 22 supplied to primary winding 41 through terminal 34, appear as positive-going pulses 45 in secondary winding 42. Fast switching diode 43 prevents energy storage capacitors 23 from discharging through secondary winding 42 between successive EDM pulses. Neon lamp 44 indicates that a truing operation is in use.

Additionally, fast switching diode 50 is electrically interposed between output wire 20 and electrode gap sensor 21. This diode permits the normal negative-going energy pulses 22 to be sensed by servo amplifier 12 as is necessary for appropriate servo action during EDM operations. Pulse carrying lines 20, 51, 52 and 53 have coaxial cables with grounded outer conductors (not shown).

While the invention has been particularly shown and described with reference to a preferred embodiment thereof, it will be understood by those skilled in the art that various changes in form and details may be made therein without departing from the spirit and scope of the invention.

What is claimed is:

1. A control for an EDM device having an EDM energy source supplying pulsed energy over an output line of a given electrical polarity to an EDM output circuit consisting of energy storage means connected to an EDM electrode of an EDM device, workpiece, a servo control for positioning said electrode and workpiece into work performing positions, a common electrical ground on said machine frame, energy storage means, workpiece, and EDM energy source, the improvement including in combination, polarity reversing means having said common ground, and switching means operative to selectively directly connect said energy source output line to said energy storage means or electrically interpose said polarity reversing means therebetween for selectively reversing the polarity of EDM pulsed energy applied to said EDM output circuit without altering said common electrical ground.

2. The control set forth in claim 1 wherein said switching means is a double-pole double-throw electrical switch having first and second sets of connection terminals for being selectively connected to a corresponding pair of common terminals respectively connected to said energy source and said EDM output circuit, said first set of terminals being electrically shorted together, and said second set of terminals being connected to said polarity reversing means such that an electrical polarity reversal occurs between terminals in said second set.

3. The control set forth in claim 2 wherein said polarity-reversing means is pulse transformer means.

4. The control set forth in claim 3 wherein said pulse transformer means includes a primary and secondary winding with a magnetically permeable core intercoupling said windings, one end of each winding being connected to a reference and the respective other ends being connected to said second set of connection terminals, respectively; the windings being oppositely pole, and unidirectional current conducting means in series circuit relationship to said secondary winding and poled such as to oppose discharge current flow from said energy storage means through said secondary winding.

5. The control set forth in claim 4 further including fast switching unidirectional current conducting means electrically interposed between said pulsed energy source and said servo control means and poled to prevent short circuit current flowing from servo control voltages so as to disable said servo control.

6. The control set forth in claim 4 wherein said primary and secondary windings have a 1:1 turns ratio.

7. An EDM electrode channel having energy pulsing means and energy storage means having an output connection, electrode servo control and gap sensing means for being operatively associated with an EDM electrode for controlling same in machining and truing operations and adapted to operate with a given polarity of energy from said pulsing means, the improvement including the combination, double-pole double-throw switch means having a common pair of terminals respectively connected to said pulsing means and to said energy storage means and two pairs of connection terminals for being selectively respectively connected to aid common terminals, a first of said connection terminals being shorted together, pulse transformer means including a primary and a secondary winding and having a ferrite core magnetically coupling said windings in opposing polarities, one end of each winding being respectively coupled to the terminals in said second set of connection terminals and the other ends of said windings being connected to a common reference point, and a neon indicating means with appropriate limiting resistor to show that reversed polarity power has been selected by said switching means.

8. The subject matter set forth in claim 7 further including fast switching unidirectional current-conducting means in series circuit relationship with said secondary winding and poled to oppose reverse current flow during a truing operation as indicated by said switch being connected to said second set of connection terminals.

9. Subject matter set forth in claim 8 wherein said pulse transformer means windings have a one-to-one relationship such that the energy transfer during machining operations is the same magnitude as energy transfer during truing operations.

* * * * *